US012756547B1

(12) United States Patent
Kleinburd et al.

(10) Patent No.: US 12,756,547 B1

(45) Date of Patent: Oct. 6, 2026

(54) INTER STAGE KEY-SWITCHING-KEY REUSE

(71) Applicant: Chain Reaction, Ltd., Tel Aviv (IL)

(72) Inventors: Noam Kleinburd, Hashmonaim (IL); Ilan Rosenfeld, Petah Tikva (IL); Oren Vrubel, Tel Aviv (IL)

(73) Assignee: Chain Reaction, Ltd., Tel Aviv (IL)

(*) Notice: Subject to any disclaimer, the term of this patent is extended or adjusted under 35 U.S.C. 154(b) by 0 days.

(21) Appl. No.: 18/897,822

(22) Filed: Sep. 26, 2024

Related U.S. Application Data

(60) Provisional application No. 63/568,472, filed on Mar. 22, 2024.

(51) Int. Cl.
*H04L 9/08* (2006.01)
*H04L 9/00* (2022.01)

(52) U.S. Cl.
CPC ............ *H04L 9/0861* (2013.01); *H04L 9/008* (2013.01)

(58) Field of Classification Search
CPC ... H04L 9/0861; H04L 9/008; H04L 27/2634; H04L 2209/122
USPC .......................................................... 713/189
See application file for complete search history.

(56) References Cited

U.S. PATENT DOCUMENTS 7,280,696 B2 10/2007 Zakrzewski et al.
9,281,941 B2 3/2016 Gentry et al.
9,906,360 B2 2/2018 Johnson et al.
10,075,288 B1 9/2018 Khedr et al.
12,155,746 B1 11/2024 Crockett
2013/0170640 A1* 7/2013 Gentry .................... H04L 9/008 380/30
2013/0216044 A1 8/2013 Gentry et al.
2016/0164670 A1 6/2016 Gentry et al.
(Continued)

FOREIGN PATENT DOCUMENTS

CN 116192361 A 5/2023
CN 116488788 A 7/2023
(Continued)

OTHER PUBLICATIONS

Jung Hee Cheon, Kyoohyung Han, Minki Hhan: Faster Homomorphic Discrete Fourier Transforms and Improved FHE Bootstrapping. IACR Cryptol. ePrint Arch. 2018: 1073 (2018).*
(Continued)

*Primary Examiner* — Meng Vang
(74) *Attorney, Agent, or Firm* — M&B IP Analysts, LLC

(57) ABSTRACT

According to an aspect of the present disclosed subject matter, an inter-stage KSK reuse method for determining a set of Key-Switching Keys (KSK) to be used in linear transformations of both Discrete Fourier Transform (DFT) and Inverse Discrete Fourier Transform (IDFT) matrices of Slots-to-Coefficients (S2C) and Coefficient-to-Slots (C2S) stages, respectively, comprising: selecting decomposition parameters and decomposing the DFT and IDFT matrices in accordance with the decomposition parameters into a plurality of merged nonzero submatrices; determining rotations offsets of the plurality of merged nonzero submatrices to enable an optimal number of rotations in the S2C stage to overlap with rotations in the C2S stage; calculating an effective set of KSK; and loading the effective set of KSKs to an internal memory of a hardware accelerator.

19 Claims, 2 Drawing Sheets

(56) References Cited

U.S. PATENT DOCUMENTS

| | | | |
|---|---|---|---|
| 2016/0164676 | A1 | 6/2016 | Gentry et al. |
| 2017/0149796 | A1 | 5/2017 | Gvili |
| 2018/0109376 | A1 | 4/2018 | Gentry et al. |
| 2019/0278600 | A1 | 9/2019 | Frumkin et al. |
| 2019/0334694 | A1 | 10/2019 | Chen et al. |
| 2019/0394019 | A1 | 12/2019 | Gao |
| 2020/0076570 | A1 | 3/2020 | Musuvathi et al. |
| 2020/0084017 | A1 | 3/2020 | Bent et al. |
| 2020/0228307 | A1 | 7/2020 | Cheon et al. |
| 2020/0403781 | A1 | 12/2020 | Gentry et al. |
| 2021/0058229 | A1 | 2/2021 | Jiang et al. |
| 2021/0194666 | A1 | 6/2021 | Georgieva et al. |
| 2021/0211290 | A1 | 7/2021 | Jindal et al. |
| 2021/0211291 | A1 | 7/2021 | Jindal et al. |
| 2021/0328766 | A1* | 10/2021 | No ........................ H04L 9/3093 |
| 2022/0172050 | A1 | 6/2022 | Dalli et al. |
| 2022/0271922 | A1 | 8/2022 | No et al. |
| 2022/0360428 | A1 | 11/2022 | Creeger et al. |
| 2022/0366059 | A1 | 11/2022 | Sasidharan Rajalekshmi et al. |
| 2023/0019214 | A1 | 1/2023 | Prothero |
| 2023/0112840 | A1 | 4/2023 | Micciancio et al. |
| 2023/0145760 | A1 | 5/2023 | Cheon |
| 2023/0216676 | A1 | 7/2023 | Lee et al. |
| 2023/0291541 | A1 | 9/2023 | Gupta et al. |
| 2023/0325529 | A1 | 10/2023 | Sav et al. |
| 2023/0336567 | A1 | 10/2023 | Gvili |
| 2023/0361986 | A1 | 11/2023 | Genise et al. |
| 2023/0385061 | A1 | 11/2023 | Ren et al. |
| 2024/0048355 | A1 | 2/2024 | Joye |
| 2024/0106632 | A1 | 3/2024 | No et al. |
| 2024/0154786 | A1 | 5/2024 | Hoshizuki et al. |
| 2024/0171372 | A1 | 5/2024 | Kim et al. |
| 2024/0171374 | A1 | 5/2024 | Tan et al. |
| 2024/0362343 | A1 | 10/2024 | Na et al. |
| 2024/0364496 | A1 | 10/2024 | Chevallier-Mames et al. |
| 2024/0396706 | A1 | 11/2024 | Dimou et al. |
| 2024/0421971 | A1 | 12/2024 | Agrawal et al. |
| 2025/0005101 | A1 | 1/2025 | Taneja et al. |
| 2025/0023715 | A1 | 1/2025 | Bae |
| 2025/0047484 | A1* | 2/2025 | Joye ...................... H04L 9/3093 |
| 2025/0055672 | A1 | 2/2025 | Bajpeyi et al. |
| 2025/0112757 | A1 | 4/2025 | Kumar et al. |
| 2025/0150254 | A1 | 5/2025 | Adir et al. |
| 2025/0167976 | A1 | 5/2025 | Van et al. |
| 2025/0211435 | A1 | 6/2025 | Maji et al. |
| 2025/0266984 | A1 | 8/2025 | Cheon et al. |
| 2025/0279886 | A1 | 9/2025 | Kao et al. |
| 2025/0300806 | A1 | 9/2025 | Vrubel et al. |
| 2025/0300807 | A1 | 9/2025 | Vrubel et al. |
| 2025/0300832 | A1 | 9/2025 | Kleinburd et al. |
| 2025/0337560 | A1 | 10/2025 | Bae et al. |
| 2025/0343671 | A1 | 11/2025 | Bae et al. |

FOREIGN PATENT DOCUMENTS

| | | | |
|---|---|---|---|
| CN | 117394982 | A | 1/2024 |
| EP | 4087177 | A1 | 11/2022 |
| KR | 102616119 | B1 | 12/2023 |

OTHER PUBLICATIONS

Cheon, Jung Hee, Han, Kyoohyung, Han, Minki, “Faster Homomorphic Discrete Fourier Transforms and Improved FHE Bootstrapping”, accessed Dec. 23, 2024, pp. 1-18, Seoul National University, Seoul, Korea.

Kim, Jongmin, Kim, Sangpyo, Choi, Jaewan, Park, Jaiyoung, Kim, Donghwan, Ahn, Jung Ho, “SHARP: A Short-Word Hierarchical Accelerator for Robust and Practical Fully Homomorphic Encryption”, Jun. 17-21, 2023, pp. 1-15, ISCA’23, Orlando, Florida.

Lattigo, “Lattigo: lattice-based multiparty homomorphic encryption library in Go”, Aug. 2024, Github, https://github.com/tuneinsight/lattigo, date accessed Dec. 23, 2024.

Samardzic, Nikola, Feldmann, Axel, Manohar, Nathan, Genise, Nicholas, Eldefrawy, Karim Peikert, Chris, “Crater Lake: A Hardware Accelerator for Efficient Unbounded Computation on Encrypted Data”, Jun. 18-22, 2022, pp. 1-15, ISCA, New York, New York.

International Search Report for PCT/IB2025/050820, dated May 7, 2025. Searching Authority, Israel Patent Office, Jerusalem, Israel.

International Search Report for PCT/IB2025/050822, dated Apr. 30, 2025. Searching Authority, Israel Patent Office, Jerusalem.

International Search Report for PCT/IB2025/050824, dated May 7, 2025. Searching Authority, Israel Patent Office, Jerusalem, Israel.

Written Opinion of the Searching Authority for PCT/IB2025/050820, dated May 7, 2025. Searching Authority, Israel Patent Office, Jerusalem, Israel.

Written Opinion of the Searching Authority for PCT/IB2025/050822, dated Apr. 30, 2025. Searching Authority, Israel Patent Office, Jerusalem.

Written Opinion of the Searching Authority for PCT/IB2025/050824, dated May 7, 2025. Searching Authority, Israel Patent Office, Jerusalem, Israel.

Zhou, Minxuan, et al. “FHEmem: A Processing In-Memory Accelerator for Fully Homomorphic Encryption”, arXiv:2311.16293v1 [cs.AR] Nov. 27, 2023.

Bossuat, Jean-Philippe, Mouchet, Christian, Troncoso-Pastoriza, Juan, and Hubaux, Jean-Pierre, “Efficient Bootstrapping for Approximate Homomorphic Encryption with Non-Sparse Keys” accessed Jul. 9, 2024.

Cheon, Jung Hee, Han, Kyoohyung, Kim, Andrey, Kim, Miran, and Song , Yongsoo, “Bootstrapping for Approximate Homomorphic Encryption”, accessed Jul. 9, 2024.

Gentry, Craig, Halevi, Shai, Smart, Nigel P., “Better Bootstrapping in Fully Homomorphic Encryption”, published Dec. 15, 2011, accessed Jul. 9, 2024.

Halevi, Shai, Shoup, Victor, “Bootstrapping for HElib”, dated Apr. 20, 2020, pp. 1-38.

Jung, Wonkyung, Kim, Sangpyo, Ahn, Jung Ho, Cheon, Jung Hee, and Lee, Younho, “Over 100x Faster Bootstrapping in Fully Homomorphic Encryption through Memory-centric Optimization with GPUs”, Published Aug. 11, 2021, vol. 2021, No. 4, pp. 114-148, accessed Jul. 9, 2024.

Kim, Andrey, Lee, Yongwoo, Deryabin, Maxim, Eom, Jieun, and Choi, Rakyong, “LFHE:Fully Homomorphic Encryption with Bootstrapping Key Size Less than a Megabyte”, published May 26, 2023, accessed Jul. 9, 2024.

Kim, J., et al. ARK: Fully Homomorphic Encryption Accelerator with Runtime Data Generation and Inter-Operation Key Reuse. May 3, 2022.

Kim, Jongmin, Lee, Gwangho, Kim, Sangpyo, Sohn, GIna, Kim, John, Rhu, Minsoo, Ahn, Jung Ho, “ARK:Fully Homomorphic Encryption Accelerator with Runtime Data Generation and Inter-Operation Key Rescue”, May 3, 2022, pp. 1-14, Seoul National University.

Bossuat, et al.; “Efficient Bootstrapping for Approximate Homomorphic Encryption with Non-Sparse Keys, 2021” (Year: 2021).

Cheon, et al.; “Faster Homomorphic Discrete Fourier Transforms and Improved FHE Bootstrapping, 2021” (Year: 2018).

Efficient Multi-Key FHE With Short Extended Ciphertexts and Directed Decryption Protocol (Year: 2019).

Hardware Acceleration for Fully Homomorphic Encryption Scheme Switching from CKKS to FHEW (Year: 2024).

Jung et al. “Over 100x Faster Bootstrapping in Fully Homomorphic Encryption through Memory-centric Optimization with GPUs” (Year: 2021).

Reagen, et al.; “Cheetah: Optimizing and Accelerating Homomorphic Encryption for Private Inference, 2021” (Year: 2021).

Wu, et al. “Bootstrapping Optimization for Fully Homomorphic Encryption Schemes”, Apr. 19, 2024, PREPRINT (Version 1) available at Research Square [https://doi.org/10.21203/rs.3.rs-4194403/v1] (Year: 2024).

* cited by examiner

INTER STAGE KEY-SWITCHING-KEY REUSE

CROSS-REFERENCE TO RELATED APPLICATIONS

This application claims the benefit of U.S. Provisional Application No. 63/568,472 filed on Mar. 22, 2024, the contents of which are hereby incorporated by reference.

The subject matter of the present application relates to U.S. patent application Ser. No. 18/767,049 filed on Jul. 9, 2024, Ser. No. 18/789,018 filed on Jul. 30, 2024, the contents of which are hereby incorporated by reference in their entirety for all purposes.

TECHNICAL FIELD

The present disclosure relates generally to fully homomorphic encryption (FHE) schemes and, more specifically, to a linear transformation.

BACKGROUND

Fully Homomorphic encryption (FHE) allows calculations on encrypted data without decrypting it first. The Cheon-Kim-Kim-Song (CKKS) encryption method is a key technique in FHE, particularly suitable for arithmetic calculations on complex numbers. CKKS supports addition, subtraction, and multiplication on ciphertexts, mirroring operations on plaintext numbers. A sequence of values can be encrypted into a single ciphertext and rotated for efficiency.

One challenge in FHE is managing noise accumulation during operations, which CKKS addresses by reducing ciphertext size after multiplications using a technique called rescaling. When ciphertext size exceeds a threshold, the bootstrapping process refreshes the encrypted text, increases its size, and allows further calculations, enabling unlimited homomorphic computations.

CKKS handles arithmetic on vectors of approximate numbers and supports operations such as addition, multiplication, scalar-vector multiplication, and rotation. It encodes complex vector data into polynomials with integer coefficients modulo a chosen modulus and performs efficient multiplication using the Number Theoretical Transform (NTT) domain. High modulus values necessitate the use of a Residue Number System (RNS) representation to reduce complexity.

Multiplication in CKKS consumes RNS residues, requiring decoding and re-encryption to maintain precision. Alternatively, bootstrapping refreshes multiple RNS levels without decoding, using complex processes like Coefficient-to-Slots (C2S) and Slots-to-Coefficients (S2C) transformations. These transformations, similar to Inverse Discrete Fourier Transform (IDFT) and Discrete Fourier Transform (DFT) homomorphic approximations, utilize matrices of complex powers of unity root in the same format.

The related art describes a bootstrapping process for Fully Homomorphic Encryption (FHE). FIG. 1 illustrates the steps of a bootstrapping process 100 that typically involves three major steps: Coefficients to Slots (C2S) 110, Polynomial Evaluation (Sine) 120, and Slots to Coefficients (S2C) 130.

C2S Step 110: This first step involves the homomorphic evaluation of the Inverse Discrete Fourier Transform (IDFT) on the encrypted polynomial message, transforming it into a format suitable for evaluation.

Polynomial Evaluation (Sine) Step 120: This step applies a homomorphic modular reduction using a sinusoidal function to scale the message and produce a remainder polynomial of the modular operation. This step accounts for the secret-key density 'h' and adjusts the message accordingly.

S2C Step 130: The final step homomorphically evaluates the Discrete Fourier Transform (DFT) on the ciphertext, reverting it to an approximate version of the original encrypted message.

The bootstrapping process is essential in FHE applications to manage noise accumulation from operations, preventing it from becoming too large and causing incorrect decryption results. The frequency of bootstrapping is determined by the application programmer to maintain the accuracy of the decrypted output.

Linear transformation algorithms are crucial for bootstrap processing and other operations in Fully Homomorphic Encryption (FHE), enabling linear functions on encrypted data for privacy-preserving computations. These algorithms are vital in cloud computing, secure data analysis, and applications like Linear Regression, Logistic Regression, Convolutional Neural Networks, and Large Language Models. However, they are computationally intensive and require significant memory. To implement FHE schemes like bootstrapping in real-time commercial applications, it is essential to accelerate these operations to meet the high computational and memory demands.

Rotation Key-Switching-Keys (KSKs) required for linear transformations in bootstrapping processes are typically implemented by available BSGS algorithm. In C2S and S2C bootstrapping, linear transformations of Discrete Fourier Transform (DFT) and its inverse DFT (IDFT) matrices are computed by decomposing them into sub-matrices. The specific decomposition parameters of these linear transformations determine the necessary rotations and which rotation KSKs can support them.

The Cooley-Tukey algorithm is a method used to compute the DFT and IDFT by factorization of the DFT matrix, having 'n' nonzero diagonals, into $\log_2(n)$ basic submatrices, each containing, for example, 2 or 3 nonzero diagonals, where 'n' is an integer number. After factorization, these basic submatrices can be merged in different ways. The merging process results in one or more C2S submatrices and one or more S2C submatrices.

Commercially available linear transformations allocate a minimum number of rotation keys: one KSK for the baby-step and one KSK for the giant-step of the BSGS algorithm. This results in a total of $2\times\rho$ KSKs, where 'ρ' represents the number of submatrices for S2C or C2S transformations, and determines the maximum computational load based on the selected decompositions.

Given that memory and memory bandwidth are primary concerns for an FHE accelerator, minimizing computational and memory resources, especially reducing the total number of KSKs, would be advantageous.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later.

According to an aspect of the present disclosed subject matter, an inter-stage KSK reuse method for determining a set of key-switching keys (KSK) to be used in linear transformations of both discrete Fourier transform (DFT) and Inverse discrete Fourier transform (IDFT) matrices of slots-to-coefficients (S2C) and coefficient-to-slots (C2S) stages, respectively, comprising: selecting decomposition parameters and decomposing the DFT and IDFT matrices in accordance with the decomposition parameters into a plurality of merged nonzero submatrices; determining rotations offsets of the plurality of merged nonzero submatrices to enable an optimal number of rotations in the S2C stage to overlap with rotations in the C2S stage; calculating an effective set of KSK; and loading the effective set of KSKs to an internal memory of a hardware accelerator.

In some exemplary embodiments, the decomposition parameters comprising: n: ρ; $\{k_i\}$; $\{(\beta, \gamma)_i\}$; $BK_i$; $GK_i$; $GiantBaby_i$.

In some exemplary embodiments, the method further comprises selecting the decomposition parameters based on an optimization technique, wherein the optimization technique utilizes a predetermined lookup table that maps hardware constraint indicators to the appropriate values of the selected decomposition parameters.

In some exemplary embodiments, the method further comprises decomposing the DFT and IDFT matrices based on the decomposition parameters, wherein each of the DFT and IDFT matrices are each decomposed into a plurality of submatrices each comprising a plurality of nonzero diagonals.

In some exemplary embodiments, determining the rotations offsets further comprises examining properties of each merged submatrix out of the plurality of merged nonzero submatrices.

In some exemplary embodiments, examining the properties further comprises identifying indices of nonzero diagonals of each merged submatrix exhibiting equal distance between one another.

In some exemplary embodiments, determining the rotations offsets further comprises computing the indices of each nonzero diagonal of each submatrix out of the plurality of merged nonzero submatrices to provide a set of baby-step rotation offsets and a set of giant-step rotation offsets, for C2S and S2C stages.

In some exemplary embodiments, an optimal number of overlapping rotations is selected from a group of possibilities adapted to maintain a balance between a memory footprint of the KSKs and computation during a runtime execution of the C2S and S2C, thereby compensating for the hardware constraints of the FHE accelerator and the internal memory.

In some exemplary embodiments, the effective set of KSKs comprises: KSKs for $R_{C2S} \cap R_{S2C}$; KSKs for $R_{C2S} \setminus R_{S2C}$; and KSKs for $R_{S2C} \setminus R_{C2S}$.

In some exemplary embodiments, the KSKs for $R_{C2S} \cap R_{S2C}$ are inter-stage KSKs, which are the sets of rotations that overlap $R_{C2S}$ and $R_{S2C}$, and are used in both the C2S and S2C stages.

According to yet another aspect of the present disclosed subject matter, a system for determining a set of key-switching keys (KSK) to be used in linear transformations of both Discrete Fourier Transform (DFT) and Inverse Discrete Fourier Transform (IDFT) matrices of a slots-to-coefficients (S2C) stage and a coefficient-to-slots (C2S) stage is provided. The system comprises one or more processors configured to: select decomposition parameters and decomposing the DFT and IDFT matrices in accordance with the decomposition parameters into a plurality of merged nonzero submatrices; determine rotations offsets of the plurality of merged nonzero submatrices to enable an optimal number of rotations in the S2C stage to overlap with rotations in the C2S stage; calculate an effective set of KSK; and load the effective set of KSKs to an internal memory of a hardware accelerator.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
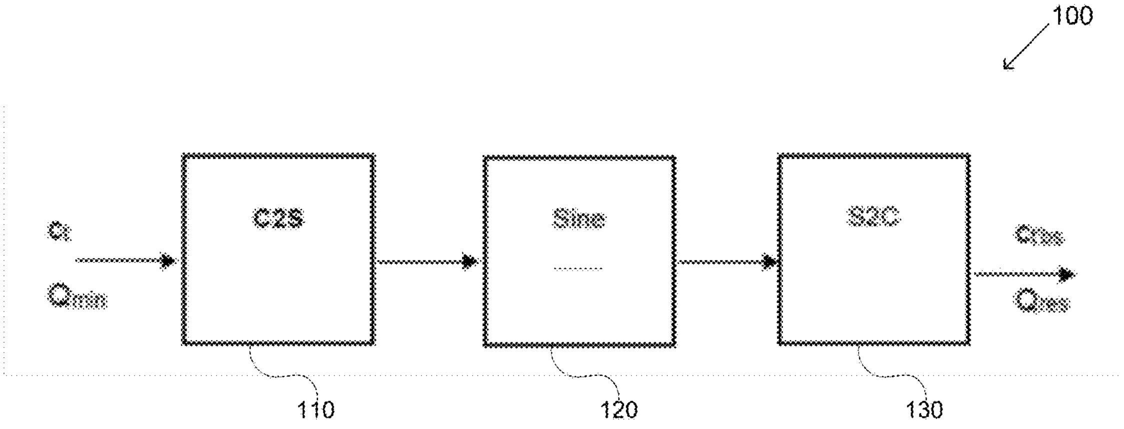
FIG. 1 illustrates the steps of a bootstrapping process in an FHE scheme.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The disclosed subject matter focuses on optimizing Fully Homomorphic Encryption (FHE) programs and bootstrapping processes, specifically in linear transformations. The primary goal is to enhance linear transformations by efficiently multiplying an unencrypted matrix with an encrypted vector to generate an encrypted output. Key objectives include minimizing external memory bandwidth, reducing memory size, and lowering computational demands for FHE accelerators. These optimizations contribute to smaller chip areas and reduced power consumption in ASIC accelerators. The disclosed embodiments are applicable across various FHE schemes, such as CKKS and BGV/BFV, aiming to streamline linear transformations for secure computations.

The present disclosure focuses on effectively managing KSK rotation offsets to achieve bootstrapping processes that lead to both computational and memory savings.

One technical problem addressed by the disclosed subject matter is the constraint of total rotation KSK memory footprint. There is a limit on the total amount of memory available for storing rotation KSKs. This constraint influences how many and which KSKs can be used effectively.

The objective of the present disclosure is to reduce the memory footprint and memory bandwidth required for KSKs that are used for linear transformation rotations in C2S and S2C stages.

One technical solution is the choice of rotations KSKs per matrix decomposition, namely, selecting a specific set of rotation KSKs for each matrix decomposition used in the bootstrapping process. It should be noted that different decompositions can require different rotations, and choosing a particular set of KSKs for each can impact performance.

Another technical solution is selecting decomposition parameters (described in detail further below) that influence some or all of the required rotations that may be utilized in both the C2S and S2C stages, i.e., overlap. Thereby allowing for calculating and storing only one set of KSKs for C2S that can be used for S2C. In some exemplary embodiments, this set of KSKs may be reused during the linear transformation of a bootstrapping process (runtime). It will be appreciated that the reused KSKs may be stored in an internal memory of an FHE accelerator chip without being discarded between the C2S and S2C stages, and bootstrapping operations.

One technical effect of utilizing the disclosed subject matter is the reduction of memory footprint. The optimized approach outlined in this disclosure has yielded significant benefits. For instance, it can achieve a 120 MB reduction in the KSK memory footprint while maintaining a manageable computational overhead.

Figure 2:
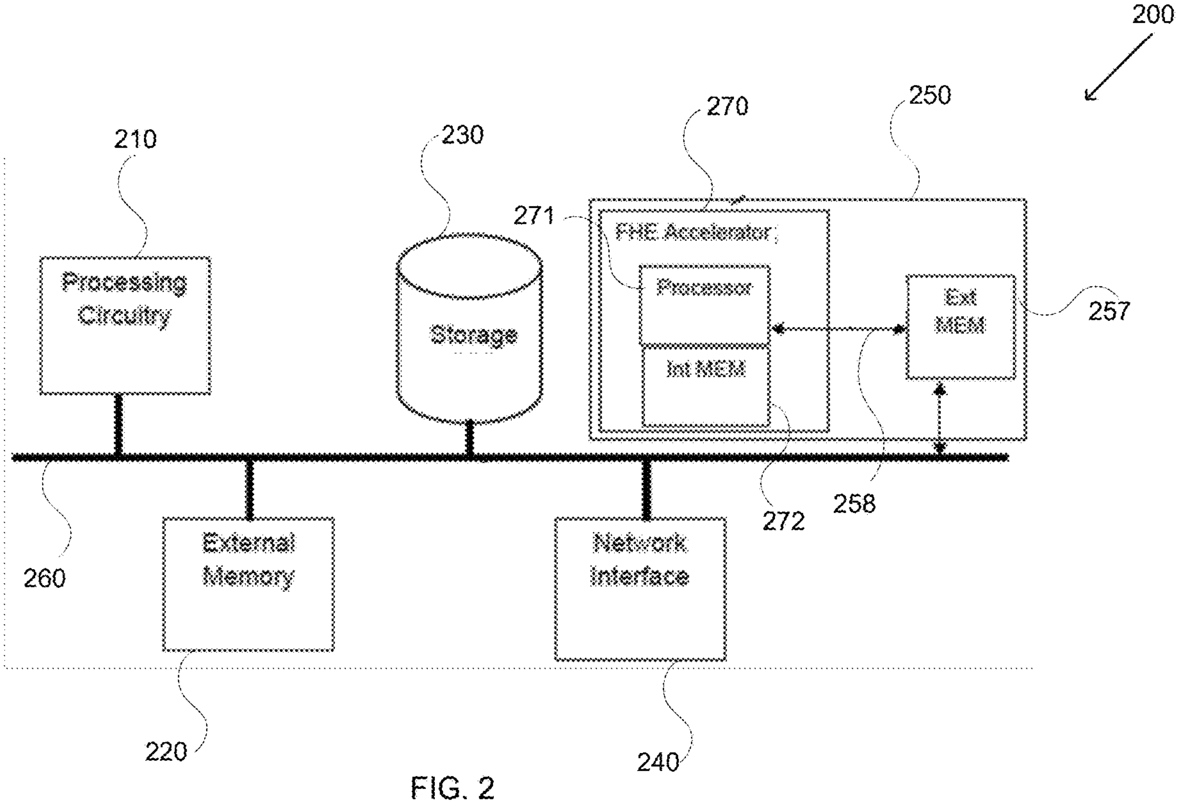
FIG. 2 is an example diagram of a server utilized to explain the various disclosed embodiments.
Figure 3:
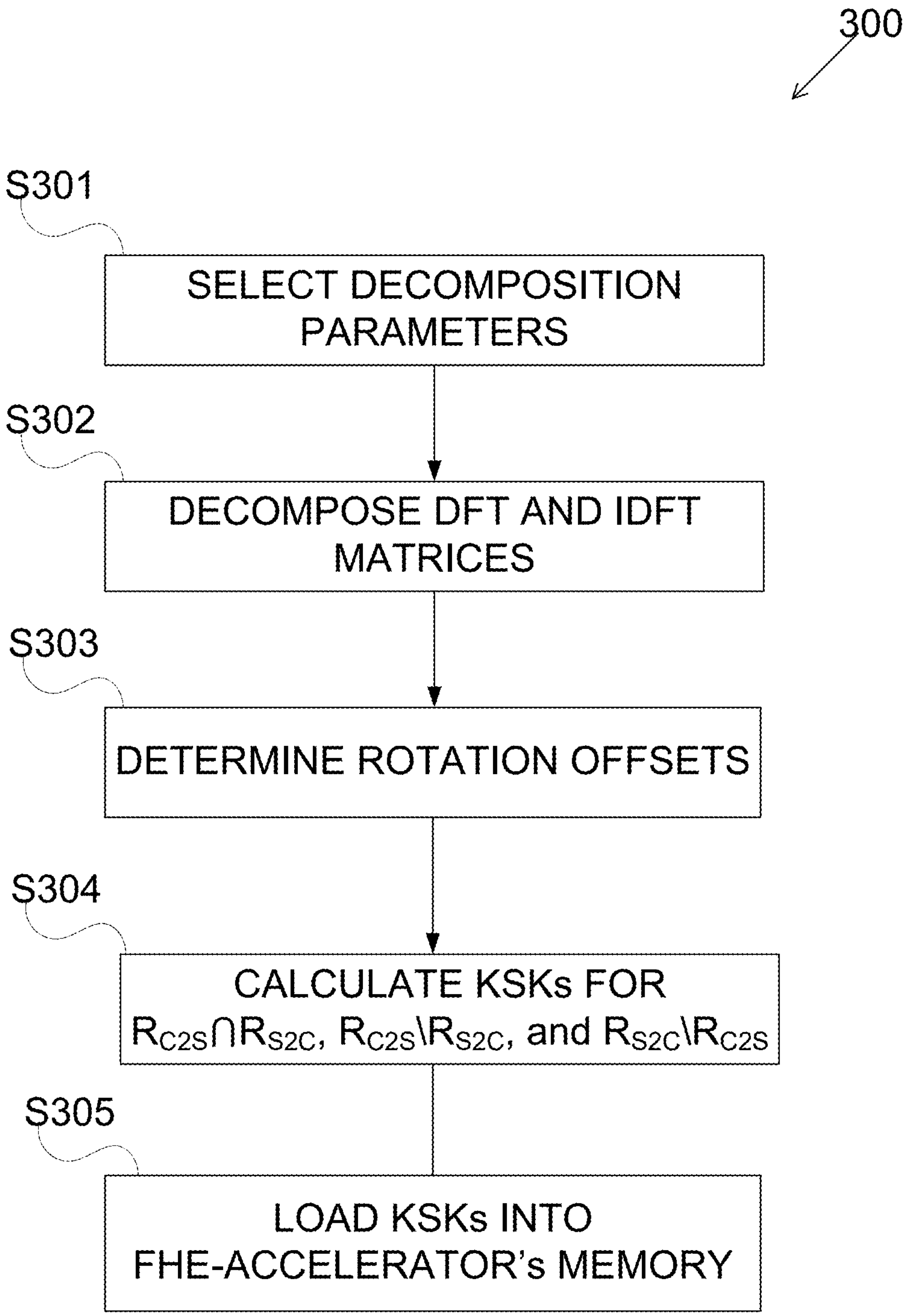
FIG. 3 shows a flowchart diagram of a method for determining inter-stage Key-Switching-Keys (KSKs).

FIG. 2 is an example diagram of a server 200 utilized to implement the disclosed embodiments. In some exemplary embodiments, server 200 may be a computerized system adapted to perform methods such as depicted in FIG. 3. Server 200 includes a processing circuitry 210 coupled to a memory 220, a storage 230, a network interface 240, and a FHE card 250. In an embodiment, the components of server 200 may be communicatively connected via a bus 260, such as, for example, a PCIe bus.

Processing circuitry 210 may be realized as one or more hardware logic components and circuits. For example, and without limitation, illustrative types of hardware logic components that can be used include Field Programmable Gate Arrays (FPGAs), Application-Specific Integrated Circuits (ASICs), Application-Specific Standard Products (ASSPs), System-On-a-Chip systems (SOCs), Graphics Processing Units (GPUs), Tensor Processing Units (TPUs), general-purpose microprocessors, microcontrollers, Digital Signal Processors (DSPs), and the like, or any other hardware logic components that can perform calculations or other manipulations of information.

Memory 220 may be volatile (e.g., random access memory, etc.), non-volatile (e.g., read-only memory, flash memory, etc.), or a combination thereof. Storage 230 may include a non-volatile memory device, magnetic disk drive, optical disk drive, tape drive, and the like. Examples of Memory 220 may include EEPROM, ROM, PROM, RAM, DRAM, SRAM, flash, firmware, programmable logic, and so on. Storage 230 may comprise an internal storage device, an attached storage device and/or a network-accessible storage device, and the like. Network Interface 240 allows Server 200 to communicate with external systems. Various communication protocols can be utilized by Network Interface 240.

Memory 220 and/or storage 230 may store software required to execute an FHE program or application, that is, a software program that requires the execution of an FHE scheme to perform one or more homomorphic operations such as bootstrapping, and linear transformation.

The FHE program repetitive execution, such as linear transformation and bootstrapping process that, according to the disclosed embodiment, is performed by FHE accelerator 270. It should be noted that software shall be construed broadly to mean any type of instructions, whether referred to as software, firmware, middleware, microcode, hardware description language, or otherwise. Instructions may include code (e.g., in source code format, binary code format, executable code format, or any other suitable format of code).

FHE card 250 is configured to rapidly perform complex encryption, decryption, and homomorphic operations. In some exemplary embodiments, FHE-Card 250 performs addition, multiplication, and rotation of unencrypted matrixes with an encrypted vector, producing an encrypted output used during Linear Transformation. The FHE-Card 250 can be installed in server 200 or operate as a standalone device. The FHE-Card 250 includes a FHE accelerator 270.

The FHE accelerator 270 includes a Processor 271 and an Internal Memory 272, or several processors with internal memory designed for accelerating FHE scheme computational tasks. Processor 271 may include multiple cores that can handle multiple computation threads simultaneously. Internal Memory 272 is a dedicated memory used by Processor 271 to store the data for executing the FHE program and routines, such as bootstrapping and linear transformation. Such data may include auxiliary data, encryption keys, indeterminate data, and the like. Internal Memory 272 is a cache memory like, designed for high bandwidth, which means it can read and write data at high speeds, enabling Processor 271 to quickly access the data stored therein. In some exemplary embodiments, Internal Memory 272 may be realized as on-die memory.

In one embodiment, FHE accelerator 270 can be realized as an ASIC. In other embodiments, FHE accelerator 270 can be realized as an FPGA, an ASSP, a SoC, and the like, or any other hardware logic components that can perform calculations or other manipulations of information.

FHE-Card 250 also includes External Memory 257 and a Memory Bus 258. Memory Bus 258 is an interface through which Processor 271 communicates with External Memory 257. In some exemplary embodiments, External Memory 257 may be an SDRAM, high bandwidth SDRAM (e.g., GDDR5, GDDR6), and high bandwidth memory (HBM). FHE-Card 250 may also include an Interface 259 to interface with Bus 260, such as a PCIe.

In some exemplary embodiments, the size of Internal Memory 272 may be significantly smaller than the size of External Memory 257. Internal Memory 272 may be realized as "on-die" memory, and the data stored therein allows for the efficient execution of an FHE scheme, specifically a bootstrapping process of such a program. For example, the difference between the memory size of the external memory and the internal memory may be the order of magnitude. In current technologies, the size of Internal Memory 272 is limited to 1 GB. Increasing the size of Internal Memory 272 would reduce the number of computing resources.

The disclosed embodiments describe a method for the efficient execution of a linear transformation algorithm, which consequently impacts the execution of bootstrapping and other FHE programs' execution. Additionally, or alternatively, the present disclosure includes computations, such as homomorphic I-DFT and DFT algorithms during the C2S and S2C steps of bootstrapping and evaluation of key switching operations. It should be understood that the embodiments described herein are not limited to the specific architecture illustrated in FIG. 2, and other architectures may be equally used without departing from the scope of the disclosed embodiments.

It will be appreciated that in FHE, a vector of complex numbers, plaintext polynomial, and ciphertext of any length can have a matrix representation. Such a matrix may be viewed as a three-dimensional (3D) matrix for the mathematical convenience of representing a plurality of diagonals (2D matrices) in the same space. Yet, it should be noted that each diagonal represents a different polynomial, a section of a polynomial, or any combination thereof. When performing matrix operations in FHE, such as matrix multiplication or matrix-vector multiplication, diagonals of matrices may be relevant. This can include various computations and operations, such as multiplication, addition, and rotation performed on encrypted data, ciphertext, plaintext, and the like, or any combination thereof.

It should be noted that in FHE, computations may employ RNS (Residue Number Systems) that efficiently represent and manipulate encrypted data by performing computations modulo a set of pairwise relatively prime moduli. RNS enhances operations like addition and multiplication. In each diagonal polynomial coefficients are associated with the columns and the residues with the rows of the matrix. Thus, the number of columns may be equal to the number of coefficients, while the number of rows may be equal to the number of residues. For example, a matrix incorporating an C2S auxiliary-data may have 56 residues (rows), i.e., (L+K) polynomial residues, whereas a matrix incorporating an S2C auxiliary-data may have 28 residues (rows), while in both cases they may have 65536 coefficients (columns).

It will be appreciated that while the embodiments of the linear transformation described in the present disclosure refer to bootstrapping and FHE operations, the disclosed linear transformation enhancements may also be utilized by other programs that implement linear transformations capable of utilizing rotation offsets.

FIG. 3 shows an example flowchart diagram of Method 300 for determining the inter-stage KSKs process according to the disclosed embodiments. In an embodiment, the method may be performed by a server or a computer prior to a runtime execution of the FHE program, including, but not limited, to a linear transformation process. For example, processing circuitry 210 of server 200 can execute method 300.

In some exemplary embodiments, the disclosed method is designed to optimize the determination of KSKs for linear transformations of Discrete Fourier Transform (DFT) and its inverse DFT (IDFT) complex matrices in S2C and C2S stages of the bootstrapping process respectively.

Method 300 is designed to determine a set of KSKs that can be reused across different stages, such as C2S and S2C, hereinafter referred to as inter-stage KSK reuse. In some exemplary embodiments, this may be achieved by selecting decomposition parameters that yield an optimal number of overlapping rotations. Specifically, some or all of the required rotations of a submatrix in the C2S stage may overlap with the required rotations of a submatrix in the S2C stage.

In some exemplary embodiments, the optimal number of overlapping rotations may be selected from a group of possibilities adapted to maintain a balance between memory and computation, compensating for the hardware constraints of the FHE accelerator 270 (FIG. 2) and its internal memory 272.

In some exemplary embodiments, the optimal number of overlapping rotations may correspond to the maximum number of overlapping rotations in both stages (C2S and S2C). Additionally, or alternatively, a set of required rotations of some or all matrices in a submatrix of the C2S stage can overlap with some or all of the required rotations of a submatrix in the S2C stage.

It will be reminded that the primary objective of method 300 is reducing the KSKs memory footprint and alleviating memory bandwidth constraints, of FHE accelerator 270 of FIG. 2.

It should be noted that since the linear transformation algorithm for DFT and IDFT are the same, the description hereinafter refers to the convenience of explanation for one, but it should be understood that the process applies to both. It should also be noted that the linear transformation algorithm may be based on the baby-step giant-step (BSGS) algorithm. BSGS algorithm was proposed as a part of "Bootstrapping for HELib" article by Shai Halevi and Victor Shoup, an annual international conference on the theory and applications of cryptographic techniques. Springer. 2015.

In S301 decomposition parameter values may be selected. In some exemplary embodiments, the decomposition parameters (parameters) consist of, but not limited to, n, ρ, $\{k_i\}$, $\{(\beta, \gamma)_i\}$, $BK_i$, $GK_i$, $GiantBaby_i$ (to be described in detail further below).

In some exemplary embodiments, the parameters are selected based on, but not limited to, optimization techniques as described in U.S. Provisional Application No. 63/568,472, filed on Mar. 22, 2024, which is hereby incorporated by reference. In an example embodiment, the optimization techniques may utilize a predetermined lookup table to map hardware constraint indicators to the appropriate parameter's values.

It should be noted that the values of the parameters influence the rotation amount of which a ciphertext is rotated (i.e., the rotation offset, also referred to as KSK offsets). This, in turn, affects the number of required rotations that may overlap between the C2S and S2C stages, consequently leading to inter-stage KSK reuse.

In S302 DFT and IDFT matrices may be decomposed. In some exemplary embodiments, Method 300 may utilize the Cooley-Tukey algorithm for decomposing the DFT and IDFT complex matrices of the C2S and S2C stages respectively by a factorization step.

It should be emphasized that DFT and IDFT matrices may be decomposed in accordance with the selected decomposition parameters of S301.

In a factorization step an I/DFT n×n two-dimensional complex matrix, which has a total number of (n) nonzero diagonals, is factorized into a product of smaller matrices known as basic submatrices. Specifically, it is factorized into $\log_2(n)$ of (n×n) two-dimensional complex basic submatrices, each of which typically includes 2 or 3 nonzero diagonals.

It should be noted that the total number of nonzero diagonals (n) and the (n) of the n×n of two-dimensional complex matrix are the same. The number of nonzero diagonals of decomposed submatrices is labeled ($n_{nzd}$). In a merging step, the basic submatrices may be merged in different ways (or left as they are). Specifically, the merging process yields submatrices from at least one consecutive basic submatrix, resulting in a total of p sub-matrices, denoted as $\rho_{S2C}$ or $\rho_{C2S}$, (abbreviated as φ.

In a final representation step, the I/DFT matrix may be expressed as a product of the ρ submatrices:

$$A_n = M_0^{(n_{nzd,o})} \cdot M_1^{(n_{nzd,1})} \cdot \ \ldots \ \cdot M_{\rho-1}^{(n_{nzd,\rho-1})}, \text{ where } M_i^{(n_{nzd,i})}$$

refers to the $i^{th}$ submatrix of the ρ submatrices that has nonzero diagonals ($n_{nzd,i}$), thus, indicating each submatrix's position and the number of nonzero diagonals it contains.

In some exemplary embodiments, a linear transformation encoding step may be performed before or after the steps of Method 300. It should be noted that Method 300 may be conducted during the bootstrapping compilation or initialization stage and NOT during runtime of any FHE program.

In some exemplary embodiments, a product of the p submatrices $$A_n = M_0^{(n_{nzd,o})} \cdot M_1^{(n_{nzd,1})} \cdot \ldots \cdot M_{\rho-1}^{(n_{nzd,\rho-1})},$$

may be obtained, where each $$M_i^{(n_{nzd,i})}$$

submatrix of $A_n$ is the result of a merging process involving at least one consecutive basic submatrices. The $i^{th}$ merged group (forming the $i^{th}$ submatrix) is comprised of $k_i$ consecutive basic submatrices.

$$1 \le k_i \le \log_2(n) \text{ and } \sum_{i=0}^{\rho-1} k_i = \log_2(n).$$

For example, a DFT or an IDFT matrix of dimensions $2^7$ by $2^7$; $\log_2(n)=7$; can be decomposed into $\rho=3$ submatrices with a choice of $k_0=2$ basic-submatrices, $k_1=3$ basic-submatrices, $k_2=2$ basic-submatrices. It should be noted that the value of $\rho$ typically varies between 2 to 5. For the sake of simplifying the mathematical process $t_i$ is defined, where $t_i=2^{k_i}$.

In some exemplary embodiments, the parameters further include obtaining the following information:

a. The value n of the n×n a two-dimensional complex matrix of the I/DFT.

b. The value of the number of submatrices $\rho$.

c. For $0 \le i < \rho$ i. The number of giant-steps ($\gamma_i$) and the number of baby-steps ($\beta_i$), where $$\beta_i = \left\lceil \frac{n_{nzd,i}}{\gamma i} \right\rceil$$

ii. The number of basic-submatrices $k_i$ merged into $$M_i^{(n_{nzd,i})},$$

where $k_i$ is an integer ranging from 1, 2, . . . , $\log_2(n)$, i.e., $k_i \in \{1, 2, \ldots, \log_2(n)\}$.

iii. The number of baby keys $BK_i$ for submatrix i, where $BK_i \in \{1, 2, \ldots, \beta_i-1\}$ iv. The number of giant keys $GK_i$ for submatrix i, where $GK_i \in \{1, 2, \ldots, \gamma_i-1\}$ v. $\text{GiantBaby}_i \in$ {True, False}.

In S303 rotations offsets may be determined. In some exemplary embodiments, as a result of observing and examining the properties of each merged $$M_i^{(n_{nzd,i})}$$

submatrix, it may be deduced that the number of nonzero diagonals $n_{nzd,i}$ is equal to $t_i$ when i=0 and when $0<i<\rho$, the number of nonzero diagonals $n_{nzd,i}=2t_i-1$. It will also be noted that the set of indices of the nonzero diagonals of each merged $$M_i^{(n_{nzd,i})}$$

submatrix exhibit equal distances between one another.

In some embodiments, overlapping rotations can be achieved by choosing parameters that maximize these overlaps, allowing the required rotations in the S2C stage to overlap with those in the C2S stage. It is important to note that the choice of decomposition parameters, particularly $\beta$, $\gamma$ selected for the $\rho_{C2S}+\rho_{S2C}$ submatrices in linear transformations determine which rotation offsets may be required, and which rotation keys might be used to support them.

According to $\{k_i\}$, the set of nonzero diagonal indices of each submatrix can be computed, leading to the determination of rotation offsets. Specifically, a set of baby-step rotation offsets $B_i$ and a set of giant-step rotation offsets $G_i$, thus defining the entire set of KSK offsets for a stage $R_{C2S}$ for C2S and $R_{S2C}$ for S2C.

It should be noted that since the DFT and IDFT matrices have a similar structure, the factorization and the subsequent merging for matrix decomposition can be applied to both DFT and IDFT. As a result, there are merging options for $\rho_{S2C}$, $\{k_i\}^{S2C}$ and $\rho_{C2S}$, $\{k_i\}^{C2S}$ where the required rotations of some (or all) submatrices in S2C may overlap with those in C2S. In such cases where this overlap occurs (i.e., $R_{C2S} \cap R_{S2C} \neq \{\emptyset\}$), the KSKs of the C2S stage can be reused in the S2C stage.

Since memory footprint, memory bandwidth, and computation time are the main concerns of an FHE accelerator aiming to accelerate the bootstrapping process, a balanced approach may be taken to yield an optimal number of overlapping rotations, which may not necessarily correspond to the maximum number of overlapping rotations in both stages (C2S and S2C). This can be illustrated in an example later on, in which lower overlapping, producing a higher memory footprint, may introduce better computational load and better overall performance.

In some exemplary embodiments, the optimization techniques may utilize a predetermined table to map hardware constraints, such as the capabilities of the FHE accelerator and its internal memory, to the appropriate parameter values. These values define the number of required rotation offsets that may overlap between the C2S and S2C stages, consequently leading to an effective set of inter-stage KSK.

In S304 an effective set of KSKs including KSKs for $R_{C2S} \cap R_{S2C}$, KSKs for $R_{C2S} \setminus R_{S2C}$, and KSKs for $R_{S2C} \setminus R_{C2S}$ may be calculated. In some exemplary embodiments, the KSKs calculated for $R_{C2S} \cap R_{S2C}$ may be the Inter-stage KSKs which are the sets of rotations that overlap $R_{C2S}$ and $R_{S2C}$, namely, the set of rotations required and can be used by both the C2S and S2C stages.

In some exemplary embodiments, the KSKs calculated for $R_{C2S} \setminus R_{S2C}$ include all the KSKs for rotations for the $R_{C2S}$ but not for the $R_{S2C}$, namely, the rotation offsets required by the C2S stage however not by the S2C stage.

In some exemplary embodiments, the KSKs calculated for $R_{S2C} \setminus R_{C2S}$ include all the KSKs for rotations for the $R_{S2C}$ but not for the $R_{C2S}$, namely, the rotation offsets required by the S2C stage, but not by the C2S stage.

For example, a maximum inter-stage KSK reuse can be achieved by setting $\rho_{S2C}=\rho_{C2S}$ and $\{k_i\}^{S2C}=\{k_i\}^{C2S}$, with all other parameters also equal. In such a case, the entire S2C process can be executed with the same KSKs of the C2S. Thereby, reducing the number of KSKs needed for both DFT and IDFT linear transformation from $2(\rho_{C2S}+\rho_{S2C})$ to $2\rho_{C2S}$.

Utilization of the inter-stage KSK reuse method of the present disclosure exhibits memory footprint savings ranging between 10 MB and 20 MB for each reused KSK between the stages. For example, in the case of six such reused keys, the savings range from 60 MB to 120 MB.

Below is an example of memory footprint saving resulting from utilizing the inter-stage KSK reuse method of the present disclosure. The example depicts the difference in memory footprint and computation expense for two sets of parameters.

| Parameter | First set of parameter values | Second set of parameter values |
|---|---|---|
| $\rho_{C2S}$ | 4 | 4 |
| $\{k_i\}_{C2S}$ | {4, 4, 4, 3} | {4, 4, 4, 3} |
| $\rho_{S2C}$ | 3 | 4 |
| $\{k_i\}_{S2C}$ | {4, 3 ,8} | {4, 4, 4, 3} |

For the first set of parameters, the possible rotation key offsets may be: $R_{C2S}=\{-2048,-8192,128,1024,-8,-64,4,1\}$ and $R_{S2C}=\{-2048,-8192,256,1024,-1,-128\}$, where the common KSKs in $R_{C2S}\cap R_{S2C}$ are $\{-2048,-8192,1024\}$, Therefore, 3 keys can be reused, resulting in a total memory requirement of 11 keys.

In the second set of parameters, there is full reuse, with $R_{C2S}=R_{S2C}=\{-2048,-8192,128,1024,-8,-64,4,1\}$. The total memory required is 8 KSKs, which represents a 27% savings compared to the second setting.

It can be concluded that in the first setting, the residual modulus after bootstrapping allows for a multiplicative depth of 10, whereas the second setting supports a multiplicative depth of 9. Consequently, a rough estimate suggests that the first setting requires approximately 10% fewer bootstrapping operations. Given that bootstrapping is the primary computational expense, this implies that the first setting demands around 10% less overall computation.

In S305 KSKs may be loaded into FHE-accelerator's memory. In some exemplary embodiments, upon the completion of calculating the KSKs for all rotations, which includes the reusable KSKs, i.e., $R_{C2S}\cap R_{S2C}$, exclusive KSKs for C2S, i.e., $R_{C2S}\setminus R_{S2C}$, exclusive KSKs for S2C, i.e., $R_{S2C}\setminus R_{C2S}$, and any combination thereof, or the like. The KSKs may be stored on any server for future execution. Additionally, or alternatively, the KSKs may be loaded into FHE accelerator internal memory (e.g., memory 272, FIG. 2) at an initialization stage of an FHE program.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An inter-stage KSK reuse method for determining a set of key-switching keys (KSK) to be used in linear transformations of both Discrete Fourier Transform (DFT) and Inverse Discrete Fourier Transform (IDFT) matrices of a slots-to-coefficients (S2C) stage and a coefficient-to-slots (C2S) stage, respectively, comprising:

selecting decomposition parameters based on an optimization technique, wherein the optimization technique utilizes a predetermined lookup table that maps hardware constraint indicators to appropriate values of the decomposition parameters, and decomposing the DFT and IDFT matrices in accordance with the decomposition parameters into a plurality of merged nonzero submatrices;

determining rotation offsets of the plurality of merged nonzero submatrices to enable an optimal number of rotations in the S2C stage to overlap with rotations in the C2S stage;

calculating an effective set of KSKs; and loading the effective set of KSKs to an internal memory of a hardware accelerator at an initialization stage of a Fully Homomorphic Encryption (FHE) program, wherein the internal memory is a dedicated memory used by a processor of the hardware accelerator to store data for executing the FHE program and routines including bootstrapping and linear transformation.

2. The method of claim 1, wherein the decomposition parameters comprise: a value n of an n×n two-dimensional complex matrix of the DFT or IDFT; a number ρ of submatrices; and, for each integer i satisfying $0 \le i < \rho$, a number $\gamma_i$ of giant-steps, a number $\beta_i$ of baby-steps, a number $k_i$ of basic submatrices merged into submatrix i, a number $BK_i$ of baby keys for the submatrix i, a number $GK_i$ of giant keys for the submatrix i, and a $GiantBaby_i$ parameter having a value of True or False.

3. The method of claim 1, further comprising: decomposing the DFT and IDFT matrices based on the decomposition parameters, wherein each of the DFT and IDFT matrices are each decomposed into a plurality of submatrices each comprising a plurality of nonzero diagonals.

4. The method of claim 1, wherein the determining the rotations offsets further comprises: examining properties of each merged submatrix out of the plurality of merged nonzero submatrices.

5. The method of claim 4, wherein examining the properties further comprises: identifying indices of nonzero diagonals of each merged submatrix exhibiting equal distance between one another.

6. The method of claim 5, wherein determining the rotations offsets further comprises: computing the indices of each nonzero diagonal of each submatrix out of the plurality of merged nonzero submatrices to provide a set of baby-step rotation offsets and a set of giant-step rotation offsets, for C2S and S2C stages.

7. The method of claim 4, wherein an optimal number of overlapping rotations is selected from a group of possibilities adapted to maintain a balance between a memory footprint of the KSKs and computation during a runtime execution of the C2S and S2C, thereby compensating for hardware constraints of the hardware accelerator and the internal memory.

8. The method of claim 1, wherein the effective set of KSKs comprises:

KSKs for rotations that overlap between the C2S stage and the S2C stage;

KSKs for rotations for the C2S stage but not for the S2C stage; and

KSKs for rotations for the S2C stage but not for the C2S stage.

9. The method of claim 7, wherein the KSKs for rotations that overlap between the C2S stage and the S2C stage are inter-stage KSKs used in both the C2S and S2C stages.

10. A non-transitory computer-readable medium storing a set of instructions for determining a set of key-switching keys (KSK) to be used in linear transformations of both Discrete Fourier Transform (DFT) and Inverse Discrete Fourier Transform (IDFT) matrices of a slots-to-coefficients (S2C) stage and a coefficient-to-slots (C2S) stage, the set of instructions comprising:

one or more instructions that, when executed by one or more processors of a device, cause the device to:

select decomposition parameters based on an optimization technique, wherein the optimization technique utilizes a predetermined lookup table that maps hardware constraint indicators to appropriate values of the decomposition parameters, and decompose the DFT and IDFT matrices in accordance with the decomposition parameters into a plurality of merged nonzero submatrices;

determine rotation offsets of the plurality of merged nonzero submatrices to enable an optimal number of rotations in the S2C stage to overlap with rotations in the C2S stage;

calculate an effective set of KSKs; and load the effective set of KSKs to an internal memory of a hardware accelerator at an initialization stage of a Fully Homomorphic Encryption (FHE) program, wherein the internal memory is a dedicated memory used by a processor of the hardware accelerator to store data for executing the FHE program and routines including bootstrapping and linear transformation.

11. A system for determining a set of key-switching keys (KSK) to be used in linear transformations of both Discrete Fourier Transform (DFT) and Inverse Discrete Fourier Transform (IDFT) matrices of a slots-to-coefficients (S2C) stage and a coefficient-to-slots (C2S) stage comprising:

one or more processors configured to:

select decomposition parameters based on an optimization technique, wherein the optimization technique utilizes a predetermined lookup table that maps hardware constraint indicators to appropriate values of the decomposition parameters, and decompose the DFT and IDFT matrices in accordance with the decomposition parameters into a plurality of merged nonzero submatrices;

determine rotation offsets of the plurality of merged nonzero submatrices to enable an optimal number of rotations in the S2C stage to overlap with rotations in the C2S stage;

calculate an effective set of KSKs; and load the effective set of KSKs to an internal memory of a hardware accelerator at an initialization stage of a Fully Homomorphic Encryption (FHE) program, wherein the internal memory is a dedicated memory used by a processor of the hardware accelerator to store data for executing the FHE program and routines including bootstrapping and linear transformation.

12. The system of claim 11, wherein the decomposition parameters include at least: a value n of an n×n two-dimensional complex matrix of the DFT or IDFT; a number ρ of submatrices; and, for each integer i satisfying $0 \le i < \rho$, a number $\gamma_i$ of giant-steps, a number $\beta_i$ of baby-steps, a number $k_i$ of basic submatrices merged into submatrix i, a number $BK_i$ of baby keys for the submatrix i, a number $GK_i$ of giant keys for the submatrix i, and a $GiantBaby_i$ parameter having a value of True or False.

13. The system of claim 11, wherein the system is further configured to: decompose the DFT and IDFT matrices based on the decomposition parameters, wherein each of the DFT and IDFT matrices are decomposed into a plurality of submatrices, wherein each of the submatrices include a plurality of nonzero diagonals.

14. The system of claim 11, wherein the system is further configured to: examine properties of each merged submatrix out of the plurality of merged nonzero submatrices.

15. The system of claim 14, wherein the system is further configured to: identify indices of nonzero diagonals of each merged submatrix exhibiting equal distance between one another.

16. The system of claim 11, wherein the system is further configured to: compute the indices of each nonzero diagonal of each submatrix out of the plurality of merged nonzero submatrices to provide a set of baby-step rotation offsets and a set of giant-step rotation offsets, for C2S and S2C stages.

17. The system of claim 16, wherein the KSKs for rotations that overlap between the C2S stage and the S2C stage are inter-stage KSKs used in both the C2S and S2C stages.

18. The system of claim 11, wherein an optimal number of overlapping rotations is selected from a group of possibilities adapted to maintain a balance between a memory footprint of the KSKs and computation during a runtime execution of the C2S and S2C, thereby compensating for hardware constraints of the hardware accelerator and the internal memory.

19. The system of claim 11, wherein the effective set of KSK comprises:

KSKs for rotations that overlap between the C2S stage and the S2C stage;

KSKs for rotations for the C2S stage but not for the S2C stage; and

KSKs for rotations for the S2C stage but not for the C2S stage.

* * * * *